United States Patent [19]

Schutt et al.

[11] 3,784,909
[45] Jan. 8, 1974

[54] PICOSECOND BEAM MONITOR

[75] Inventors: Dale W. Schutt, South Bend, Ind.; Gerhard O. Beck, Berlin, Germany

[73] Assignee: The United States of America as represented by the United States Atomic Energy Commission, Washington, D.C.

[22] Filed: Jan. 23, 1973

[21] Appl. No.: 325,961

[52] U.S. Cl............ 324/71 EB, 324/71 R, 250/397, 250/374
[51] Int. Cl. .......................................... G01n 27/00
[58] Field of Search...................... 324/71 R, 71 EB; 313/63; 328/233

[56] References Cited
UNITED STATES PATENTS
3,600,580  8/1971  Vogel.......................... 324/71 EB X
3,207,982  9/1965  Rose............................... 324/71 EB FOREIGN PATENTS OR APPLICATIONS
1,018,168  10/1957  Germany.............................. 324/33

Primary Examiner—Rudolph V. Rolinec
Assistant Examiner—R. H. Hille
Attorney—Roland A. Anderson, John A. Horan & Donald P. Reynolds

[57] ABSTRACT

Current in the beam of a particle accelerator is monitored with picosecond resolution by causing the beam to impinge upon the center conductor of a coaxial line, generating a pulse of electromagnetic energy in response thereto. This pulse is detected by means such as a sampling oscilloscope.

7 Claims, 7 Drawing Figures

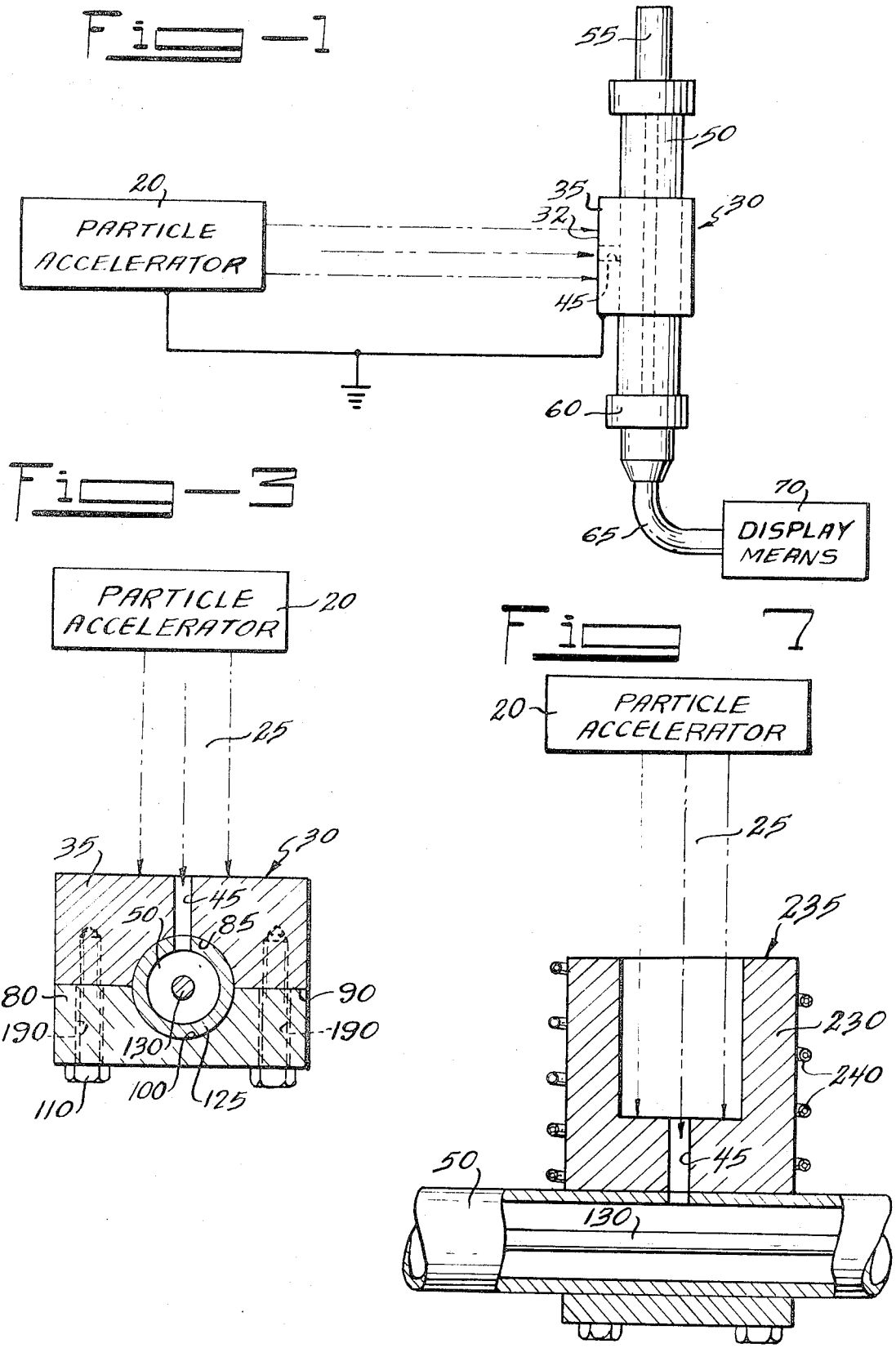

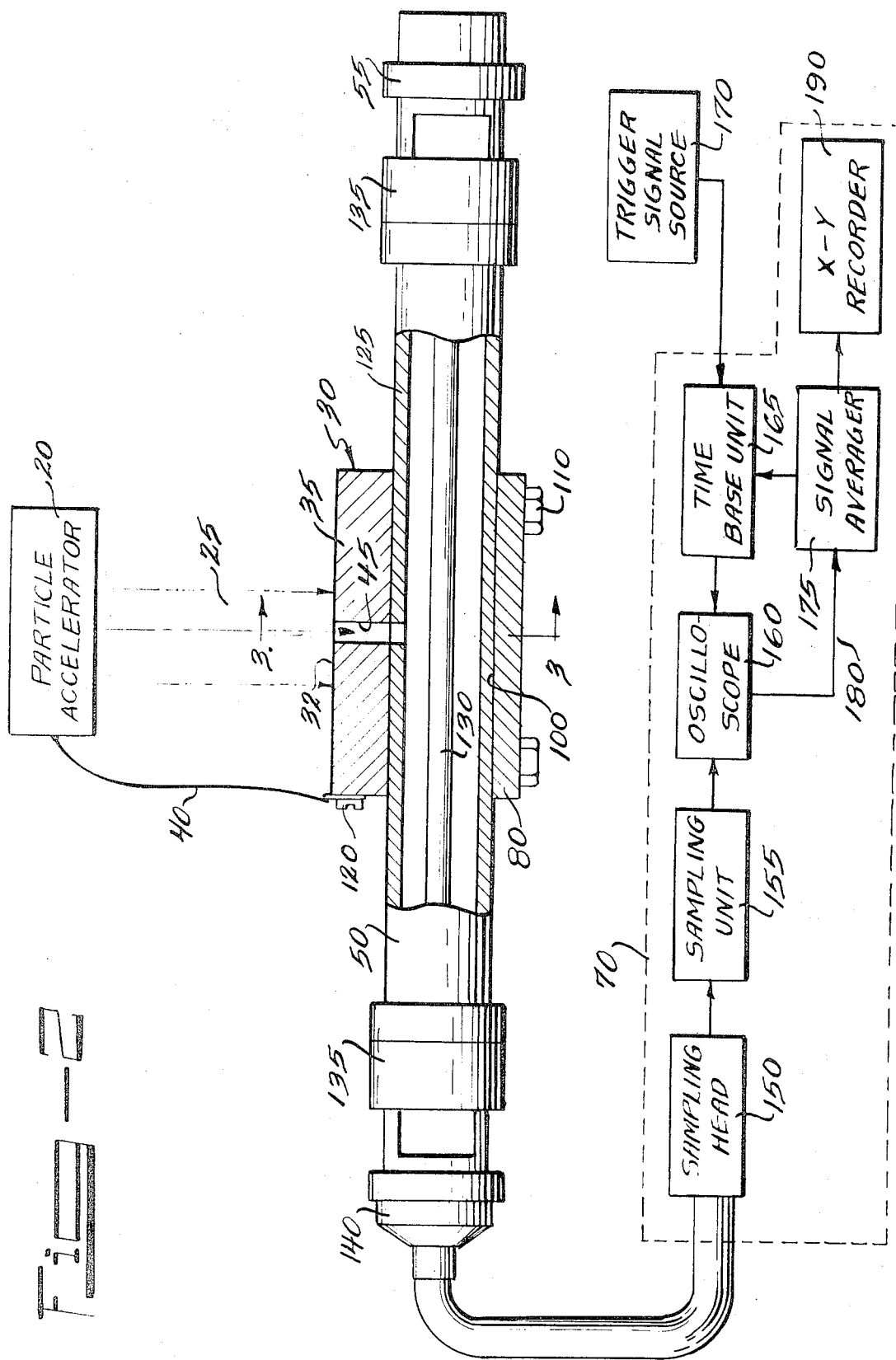

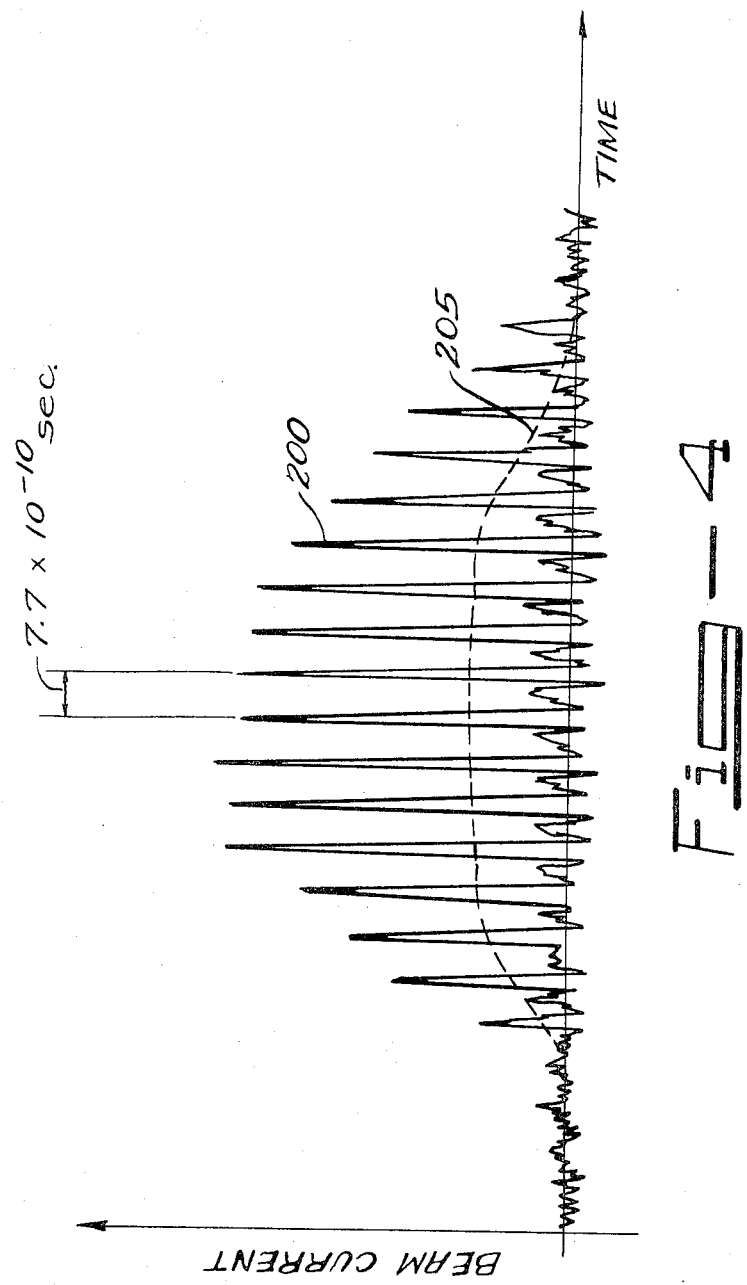

3,784,909

PICOSECOND BEAM MONITOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to measurement of the current in a beam of charged particles. It is particularly useful to obtain increased temporal resolution in an oscilloscope or other visible display of such beam current.

A commonly used device for monitoring particle beams is the Faraday-cup monitor. This is basically an electrical conductor that is placed in the path of all or part of a beam. The need to prevent backscatter of particles often dictates the use of a concave or reentrant geometry such as a cup, thus giving rise to the name used. In early applications of the Faraday cup to beam monitoring, the cup was insulated from electrical ground and was used as a current integrator or charge collector. An electrometer connected between the cup and ground provided an appropriately high-impedance measurement of the voltage and thus an indication of the beam current. This technique was described as early as 1956 in an article by Brown and Tautfest in "Review of Scientific Instruments," Vol. 27, No. 9, p. 696.

An alternate means of using the Faraday cup has become more common as a measure of the pulse shape in a beam of charged particles. Typical of such a means is the Model 624 Faraday cup, manufactured and sold by Ortec, Inc. This is a pair of hollow coaxial conducting cylindrical shells disposed in nested fashion on a beam axis to that the beam enters a first end of the smaller of the two cylinders. Each cylinder is closed at the end opposite the first end by a conically tapering shell so that the beam impinges upon and is collected by the smaller conical shell. The cylinders are insulated from each other, and are typically brought out electrically to a coaxial fitting. The inner cylindrical structure is normally connected to the center conductor of the coaxial fitting, the outer cylindrical structure, to the outer conductor. Such a fast Faraday cup is responsive to pulses of current that change over periods of time that are greater than the reciprocal of the high-frequency cut-off of the device. The term "fast" is applied in the description of this device to indicate its capability of resolving pulses having components of high frequency, typically of the order of 100 megahertz. This corresponds to a sensitivity to amplitude changes over periods as short as 10 nanoseconds. Pulses having frequency components above the high-frequency cutoff of the Faraday cup provide a representation that lacks the fine structure of the higher-frequency components. The Faraday cup acts as a low-pass filter to the pulse. Such a filter is adequate for viewing pulses having few components above the cut-off frequency of the filter. The capacitance between the cup and electrical ground, however, is inescapable in fixing the cut-off frequency of the Faraday-cup monitor. It is a limit whether the Faraday cup is used as a current integrator or as a pulse monitor.

One means of increasing the cut-off frequency of a Faraday cup comprises reducing the size of the cup. This reduces the capacitance of the device. However, it also reduces the heat-dissipating capability and thus the current capacity. The usable upper limit of pulse resolution is in the nanosecond range for beams frOm existing accelerators.

It is an object of the present invention to provide a better method and means of measuring current in a beam.

It is a further object of the present invention to provide a method and means of evaluating the temporal fine structure of the beam in a particle accelerator.

It is a further object of the present invention to provide a method and means of measuring the beam of a particle accelerator to detect current variations over picosecond intervals.

Other objects will become apparent in the course of a detailed description of the invention.

SUMMARY OF THE INVENTION

The beam current in the beam of a particle accelerator is detected and displayed with picosecond resolution by using the beam to generate an electromagnetic pulse having a waveform corresponding to the beam current. This pulse is transmitted by coaxial cable to means such as a sampling oscilloscope for display.

BRIEF DESCRIPTION OF THE DRAWINGS

FIG. 1 is a schematic diagram showing an apparatus for the practice of the present invention.

FIG. 2 is a combined axial partial sectional view and block diagram further illustrating the apparatus of FIG. 1.

FIG. 3 is a sectional view along section lines 3—3 of FIG. 2.

FIG. 4 is a graph of beam current as a function of time as obtained by the apparatus of FIG. 1.

FIG. 7 is an axial sectional view of an alternate embodiment of the present invention.

DETAILED DESCRIPTION OF THE PREFERRED EMBODIMENT

Figure 5:
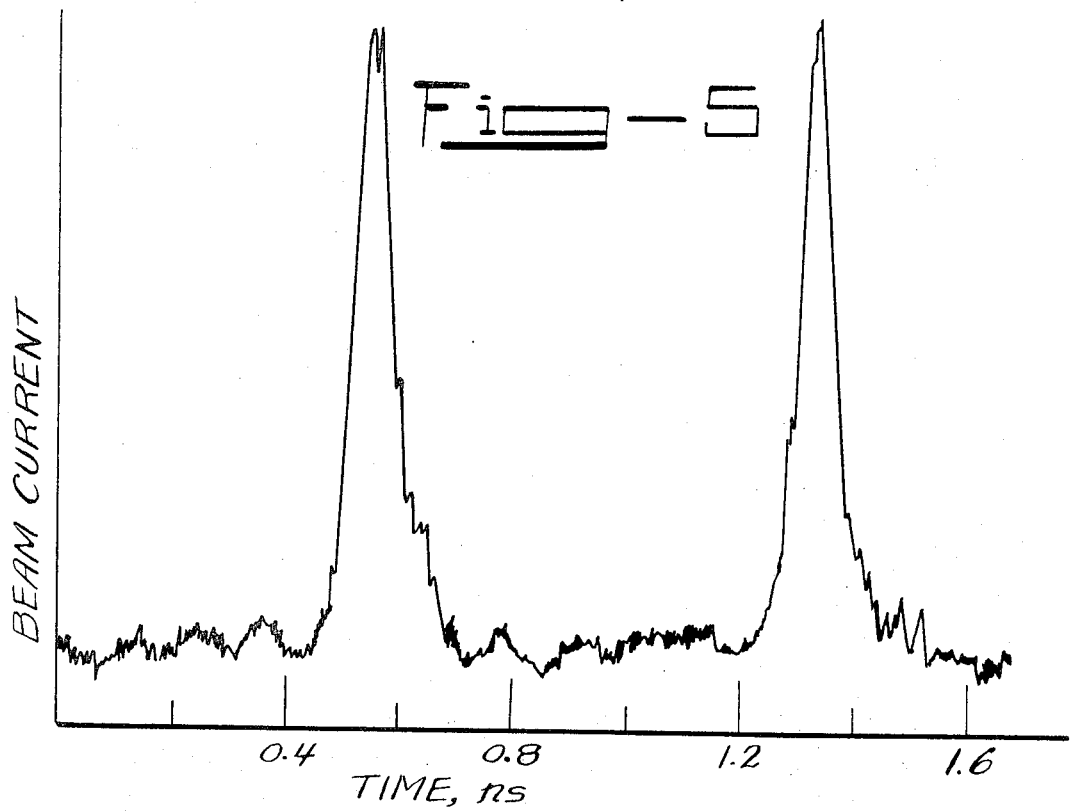
FIG. 5 is a graph of two spikes of a pulse of beam current similar to that of FIG. 4.

FIG. 1 is a schematic view of an apparatus for the practice of the present invention. In FIG. 1, particle accelerator 20 is a conventional device for generating a beam 25 of charged particles such as electrons Or ions. Beam 25 impinges upon stopping block 30 which is a metal assembly presenting a flat surface 32 of beam sampler 35 perpendicular to beam 25. Ground connection 40 provides a return path for the electrical current comprising the charged partIcles flowing in beam 25. Most of these particles strike surface 32. A predetermined portion of beam 25 proceeds through aperture 45, which passes through surface 32, beam sampler 35 and into coaxial air line 50. A pulse is generated in air line 50 by the incident portion of beam 25. This pulse splits into two portions which travel in opposite directions along air line 50. One portion of the split pulse proceeds toward and is absorbed without loss in termination 55. The other portion proceeds in the opposite direction along air line 50 through adapter 60 to cable 65 and thence to displaY means 70.

Further understanding of the invention may be obtained from FIGS. 2 and 3. FIG. 2 is an axial partial sectional view of the detector of the present invention and a functional block diagram of an assembly of electronic equipment comprising display means. FIG. 3 is a cross-sectional view of the detector along section lines 3—3 of FIG. 2. In FIG. 2, particle accelerator 20 generates beam 25 of charged particles, which impinges upon stopping block 30. It is common to permit such a beam to exit from the partial vacuum of an accelerator through a thin window of titanium of stainless steel, and thus to place stopping block 30 in the atmosphere outside the partial vacuum of the interior of particle accelerator 20.

Stopping block 30 is an assembly comprising beam sampler 35 and back plate 80. Beam sampler 35 comprises a rectangular parallelepiped with a semicylindrical groove. Typical outer dimensions of stopping block 30 are 8.0 cm. × 6.0 cm. × 2.5 cm. The large surface is disposed perpendicular to beam 25 so that beam 25 is incident upon the centroid of this surface. Semicylindrical groove 85 is cut into the surface 90 of beam sampler 35 opposite to that of incidence of beam 25. The axis of groove 85 is parallel to the long dimension of beam sampler 35, and is in the plane of surface 90 of beam sampler 35. Aperture 45 is a hole having a diameter of 2 mm. that passes through the centroid beam sampler 35 in the direction of beam 25 and intersects the axis of groove 85. Back plate 80 is a rectangular parallelepiped having a semicylindrical groove 100 equal in size to groove 85. Back plate 80 has dimensions 8.0 cm. × 6.0 cm. × 2.0 cm., and groove 100 is disposed with its axis in a large surface of back plate 80, running parallel to the 8.0 cm. dimension. Four cap screws 110 extend through holes drilled through back plate 80 into holes tapped in beam sampler 35 to affix back plate 80 to beam sampler 35, forming a rectangular parallelepiped that is stopping block 30 with grooves 85 and 100 aligned to form a cylindrical hole therethrough. The cylinder comprised of grooves 85 and 100 is sized to make frictional contact with air line 50, a section of cylindrical conventional air-insulated coaxial transmission line such as a General Radio GR-874-L30L 30-cm. air line. The frictional contact between air line 50 and stopping block 30 provides electrical contact therebetween to establish the same electrical potential on both. Terminal 120 is a screw affixed to beam sampler 35 to connect ground connection 40 between beam sampler 35 and accelerator 20. Aperture 45 is continued in a straight line through cylindrical outer conductor 125 of air line 50 along a radius of outer conductor 125 so that a portion of beam 25 proceeds through aperture 45 to impinge upon center conductor 130 of air line 50. The incidence of the charged particles in this portion of beamm 25 upon center conductor 130 generates a pulse of electromagnetic energY which propagates in both directions along air line 50. One part of the energy proceeds toward termination 55, where it is absorbed Without reflection or with minimal reflection. A locking collar 135 is dropped coaxially with and touching air line 50 and termination 55 to maintain them in good physical and electrical contact and thus minimize reflection of electromagnetic energy. It is necessary to select a value of impedance for termination 55 that matches the characteristic impedance of air line 50 to minimize reflection.

The other part of the energy propagating along air line 50 proceeds in the opposite direction toward adapter 140. A locking collar 135 is disposed here coaxially with and touching air line 50 and adapter 140 to maintain good physical and electrical connection therebetween to facilitate propagation and minimize reflection of electromagnetic waves. From adapter 140, the electromagnetic energy proceeds along coaxial cable 145 to display means 70, a conventional arrangement for detecting extremely short pulses. Cable 145 is connected to a sampling head 150 such as a Tektranix S-4 Sampling Head, thence to a sampling unit 155 such as a Tektronix 7S11 Sampling Unit. The output of sampling unit 155 is connected to and displayed upon an oscilloscope 160 such as a Tektronix Model 7904 Oscilloscope. A sweep signal is derived from time base unit 165, an apparatus such as tektronix 7T11 Time Base Unit, which in turn is synchronized with the pulse being observed through an input from trigger signal source 170. This source is derived from the beam of accelerator 20 and is used to supply the fast trigger to time base unit 165 and thence to oscilloscope 160. Time base unit 165 is also connected electrically to control signal averager 175, an apparatus such as a Northern Scientific Model NS 544 Signal Averager. A signal from oscilloscope 160 is connected electrically through connection 180 to signal averager 175, which in turn supplies a slow sweep to oscilloscope 160 through connection 185. Signal averager 175 provides a picture that is the average of a predetermined number of slow sweepS of oscilloscope 160. The picture thus obtained is recorded on plotter 190, an apparatus such as an X-Y Recorder.

FIG. 4 is a typical graph of beam current as obtained by the apparatus of FIGS. 2 and 3 from the beam of an ARCO Model LP-7 L-band linear electron accelerator. The ordinate of FIG. 4 is beam current, plotted to an arbitrary scale, and the abscissa is time. Two curves are shown. Curve 200 shows the fine structure of the beam current pulse as Obtained by the apparatus of FIGS. 2 and 3. This pulse exhibits time variations that are too rapid to be resolved by present beam current monitors. Equipment presently in use would produce curve 205 in response to the input that produced curve 200 on the appratus of FIGS. 2 and 3. It can thus be seen from FIG. 4 that the apparatus of the present invention allows the resolution of the fine structure in pulses whose peaks are separated by a time of $7.7 \times 10^{-10}$ seconds.

FIG. 5 is an expanded view representing a graph of two spikes of a pulse similar to that of FIG. 4. The units of beam current are arbitrary, since the shape of the curve and the relative heights of its peaks are of more concern in detailing fine structure than the value of the units of current. The separation of the peaks of the pulses of FIG. 5 is approximately 0.77 nanosecond, which is the period of one cycle of the linear accelerator producing the beam. This is an ARCO Model LP-7 L-band linear electron accelerator operatIng at 1301 MHz to produce an electron beam having a mean energy of 8 MeV in pulses having an envelope width of 10 nanoseconds. The apparatus of the present invention readily resolves the fine structure of these pulses.

Figure 6:
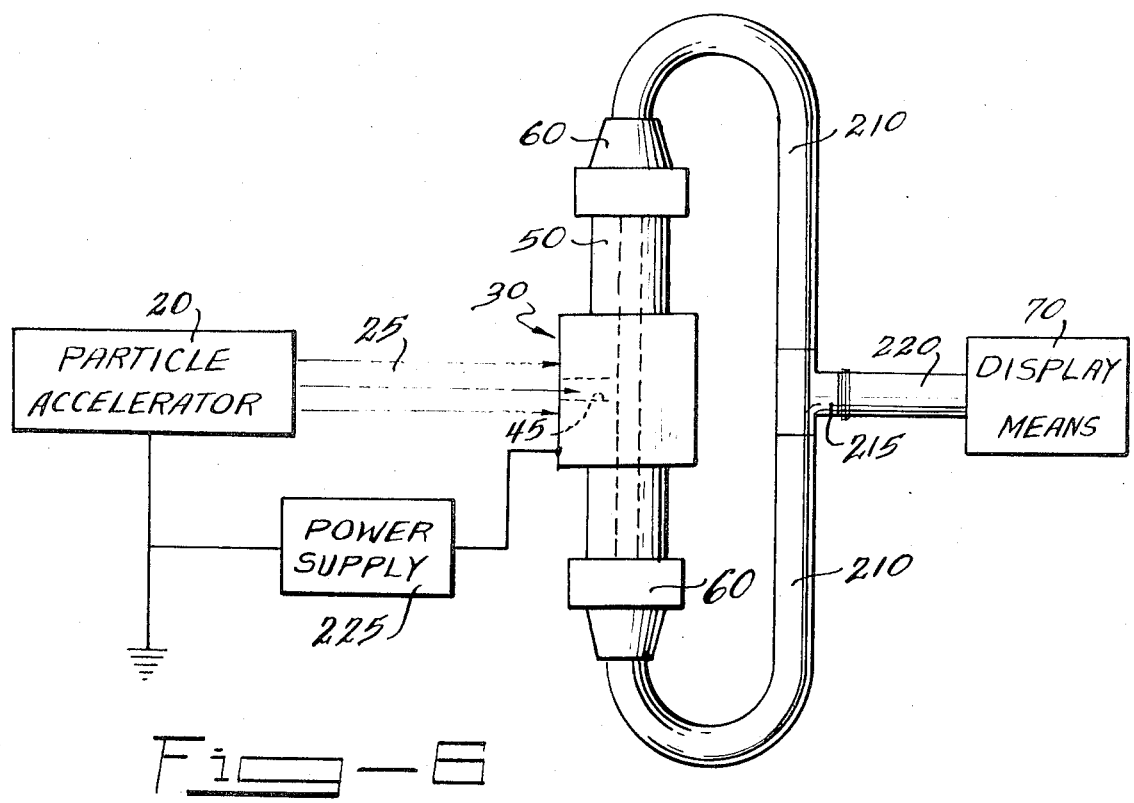
FIG. 6 is a schematic diagram showing the apparatus of the present invention employed in an alternate embodiment.

An alternate preferred embodiment of the present invention is shown in FIG. 6. This embodiment is useful when it is desired to maintain a potential difference between the accelerator and portions of the detector. In FIG. 6, particle accelerator 20 generates beam 25 which is incident upon stopping block 30, comprising beam sampler 35 and back plate 80. A portion of beam 25 proceeds through aperture 45 and impinges upon center conductor 130 of air line 50, in the same manner as shown in FIG. 1. In FIG. 6, however, two adapters 60 are used, with one connected to each end of air line 50. from each adapter 60, a cable 210 is connected to tee 215, which combines the pulses generated when beam 25 impinges upon center conductor 130. Tee 215 is connected through cable 220 to transmit the combined signal to display means 70. Stopping block 30 is connected electrically to power supply 225, which is connected to accelerator 20. The embodiment of FIG. 6 allows the stopping block 30 to be operated at voltage different from the accelerator ground, and also permits the center conductor 130 to be operated at a predetermined d.c. voltage different from the accelerator ground. A measure of the current through power supply 225 also provides a measure of beam current.

A further alternate embodiment of the apparatus of the present invention is shown in FIG. 7. This embodiment allows the use of heavier beam currents. In FIG. 7, a modified stopping block 230 is disposed to receive a beam 25 of particles from accelerator 20. Aperture 45 admits a portion of beam 25 to impinge upon center conductor 130 of air line 50. A cuplike cylindrical extension 235 of stopping block 230 provides a reentrant geometry to minimize backscatter of particles incident upon stopping block 230. The capacity of stopping block 230 to handle heavy beam currents is further enhanced by affixing cooling coil 240 in thermal contact with the extension 235. Water is passed through cooling coil 240 to remove from stopping block 230 the heat generated by the impact of dense beams of particles.

Persons skilled in the art will readily adapt the teachings of the present invention to methods and means different from those described and illustrated above. Accordingly, the scope of the present invention should be limited only in accordance with the appended claims.

The embodiments of the invention in which an exclusive property or privilege is claimed are defined as follows:

1. A detector of the intensity of a beam of charged particles comprising:
    a section of coaxial transmission line having a hole in an outer conductor;
    a stopping block mounted to accept said beam of charged particles, said stopping block coupled electrically and mechanically to said outer conductor of said transmission line, further said stopping block having a hole aligned with said hole in said outer conductor of said transmission line to form a straight passage intercepting the inner conductor of said transmission line to permit said charged particles to impinge upon said inner conductor and generate a pulse of electromagnetic energy in said transmission line in response thereto; and
    detecting means connected electrically to an end of said transmission line to detect and display said electrical signal, which signal is a measure of the intensity of said beam of charged particles.

2. The apparatus of claim 1 comprising in addition a resistive termination connected electrically tO a first end of said section of coaxial transmission line.

3. The apparatus of claim 1 wherein said detecting means are connected electrically to both ends of said coaxial transmission line.

4. The apparatus of claim 2 wherein said coaxial transmission line comprises a pair of rigid coaxial conducting elements supported physically and insulated electrically from each other by wafers of solid dielectric near the ends of said transmission line and insulated electrically from each other by air along the rest of the length of said line.

5. The apparatus of claIm 4 wherein said detecting means comprise a sampling oscilloscope.

6. The apparatus of claim 5 wherein said detecting means comprise in addition a signal averager connected electrically and operationally to said sampling oscilloscope and a plotter connected electrically to said signal averager and oscilloscope to prepare a plot of an averaged sampled signal, which signal is proportional to the intensity of said beam of charged particles.

7. A method of viewing the intensity of a beam of charged particles comprising:
    disposing a coaxial transmission line having a hole in an outer conductor in said beam so as to cause said beam to impinge upon the inner conductor of said transmission line and generate an electrical signal in response thereto;
    detecting said electrical signal; and
    generating a visual signal having the form of said electrical signal, which visual signal provides a view of the intensity of said beam.

* * * * *